(12) United States Patent
Ichikawa et al.

(10) Patent No.: US 8,103,386 B2
(45) Date of Patent: Jan. 24, 2012

(54) POWER SYSTEM

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 465 days.

(21) Appl. No.: 12/308,900

(22) PCT Filed: Jul. 23, 2007

(86) PCT No.: PCT/JP2007/064826
§ 371 (c)(1),
(2), (4) Date: Dec. 29, 2008

(87) PCT Pub. No.: WO2008/023536
PCT Pub. Date: Feb. 28, 2008

(65) Prior Publication Data
US 2009/0192655 A1    Jul. 30, 2009

(30) Foreign Application Priority Data
Aug. 25, 2006    (JP) .................................. 2006-229128

(51) Int. Cl.
*G06F 19/00*    (2011.01)
(52) U.S. Cl. ........................................ 700/286; 700/297
(58) Field of Classification Search .................. 700/286, 700/287, 291, 297; 702/62; 320/109
See application file for complete search history.

(56) References Cited

U.S. PATENT DOCUMENTS

| | | | |
|---|---|---|---|
| 2,525,568 A * | 10/1950 | Van Dorp et al. | 568/356 |
| 7,120,520 B2 * | 10/2006 | Seto et al. | 700/297 |
| 2004/0249516 A1 * | 12/2004 | Seto et al. | 700/295 |
| 2007/0282495 A1 * | 12/2007 | Kempton et al. | 701/22 |
| 2008/0039989 A1 * | 2/2008 | Pollack et al. | 701/22 |
| 2008/0052145 A1 * | 2/2008 | Kaplan et al. | 705/8 |

FOREIGN PATENT DOCUMENTS

| | | |
|---|---|---|
| JP | A-06-038384 | 2/1994 |
| JP | A-06-161989 | 6/1994 |
| JP | A-06-292304 | 10/1994 |
| JP | A-2001-008380 | 1/2001 |
| JP | A-2001-258177 | 9/2001 |
| JP | A-2002-084673 | 3/2002 |
| JP | A-2005-152976 | 5/2002 |
| JP | A-2002-169613 | 6/2002 |

(Continued)

OTHER PUBLICATIONS

Brooks et al., Integration of electric Drive Vehicles with the Electrical Power Grid a New value Stream, EVS 18 Berline, 2001, pp. 1-15.*

(Continued)

*Primary Examiner* — Kidest Bahta
(74) *Attorney, Agent, or Firm* — Oliff & Berridge, PLC

(57) ABSTRACT

A data acquiring unit (122) acquires external factor data such as day of the week, date and time, or weather together with electric power data in a house, and stores the data in a storage unit (114). A classification/learning unit (124) reads the electric power data and the external factor data stored in the storage unit (114), and classifies/learns the read data. A scheduling unit (126) predicts a house power demand on the basis of the classified/learned data, and plans the charge/discharge of a vehicle according to the result of prediction. A command generating/outputting unit (128) generates a charge/discharge command of the vehicle according to the charge/discharge schedule.

7 Claims, 19 Drawing Sheets

FOREIGN PATENT DOCUMENTS

| | | |
|---|---|---|
| JP | A-2002-245126 | 8/2002 |
| JP | A-2002-315193 | 10/2002 |
| JP | A-2003-274554 | 9/2003 |
| JP | A-2004-222176 | 8/2004 |
| JP | A-2004-364467 | 12/2004 |
| JP | A-2006-204081 | 8/2006 |

OTHER PUBLICATIONS

Japanese Office Action in Japanese Patent Application No. 2006-229128; dated Feb. 1, 2011 (with English-language translation).

Japanese Office Action issued in Japanese Patent Application No. 2006-229128 on Mar. 9, 2010 (with English-language translation).

* cited by examiner

POWER SYSTEM

TECHNICAL FIELD

The present invention relates to a power system and, more specifically, to power management of a power system that uses a vehicle capable of storing and generating electric power as one power source.

BACKGROUND ART

Japanese Patent Laying-Open No. 2001-8380 discloses a power management system allowing transmission of electric power between a house and a battery of an electric vehicle. The system includes reserved power amount determining means for calculating an amount of power to be reserved in the battery to enable normal use of the electric vehicle, and a controller for restricting the amount of power supplied from the battery to the amount obtained by subtracting the reserved power amount from the remaining capacity of the battery.

According to the power management system, the amount of power that allows normal use of the electric power is reserved in the battery and the remaining power of the electric power is supplied to the house. Therefore, in case of emergency or the like, the electric vehicle can be used.

In the power management system disclosed in Japanese Patent Laying-Open No. 2001-8380, while an electric vehicle is used as a source of power for the house, state of power demand and supply in the house is not considered when the electric power is supplied from the electric vehicle to the house or when the electric vehicle is charged from the house.

DISCLOSURE OF THE INVENTION

Therefore, an object of the present invention is to provide a power system that manages electric power received and supplied between the vehicle and the house, taking into consideration the state of power demand and supply in the house.

According to the present invention, the power system includes a vehicle, a connecting device and a power management device. The vehicle is configured to be capable of outputting electric power stored in a power storage device to the outside of the vehicle and capable of charging the power storage device from the outside of the vehicle. The connecting device is configured to be capable of receiving and supplying electric power between the vehicle and a power line in a house. The power management device manages electric power in the house. The power management device includes a data storage unit and a first controller. The data storage unit stores data of electric power supplied to the house and electric power consumed by the house, and data related to an external factor having an influence on increase/decrease of the supplied electric power and the consumed electric power. The first controller controls charge/discharge of the vehicle electrically connected to the house by the connecting device, based on the data stored in the data storage unit.

Preferably, the vehicle includes a power storage device, a voltage converting device, a communication device and a second controller. The voltage converting device is configured to be capable of converting voltage between the power storage device and a power line in the house connected by the connecting device. The communication device is provided for communication with the power management device through the connecting device. The second controller controls the voltage converting device based on a command received from the power management device by the communication device.

Preferably, the first controller includes a classification unit and a planning unit. The classification unit classifies electric power data stored in the data storage unit based on the external factor data stored in the data storage unit. The planning unit plans charge/discharge of the vehicle connected to the house by the connecting device, based on the data classified by the classification unit.

More preferably, the classification unit classifies the electric power data stored in the data storage unit, using any of cluster analysis, hidden Markov model and neural network techniques.

Preferably, the planning unit plans charge/discharge of the vehicle based on amount of carbon dioxide emitted for generating electric power consumed by the house.

Preferably, the planning unit plans charge/discharge of the vehicle based on electric power cost of the house.

Preferably, the power management device further includes a setting unit. The setting unit is provided for allowing a user to set a charge/discharge plan of the vehicle. The planning unit plans charge/discharge of the vehicle based on the charge/discharge plan set by the setting unit.

In the present invention, electric power is received and supplied between a rechargeable vehicle and a power line in the house, through the connecting device. The data storage unit stores data of electric power (electric power data) supplied to the house and consumed in the house, as well as data related to external factors (external factor data) that affect increase/decrease of supplied and consumed electric power. The external factor data may include day of the week, date and time, weather, and schedule of a user (resident). The first controller controls charging/discharging of the vehicle electrically connected to the house by the connecting device, based on the data stored in the data storage unit.

Therefore, according to the present invention, it becomes possible to manage electric power received and supplied between the vehicle and the house in consideration of the state of power demand and supply in the house. As a result, supply and demand of electric power in the house can be optimized.

BEST MODES FOR CARRYING OUT THE INVENTION

Figure 1:
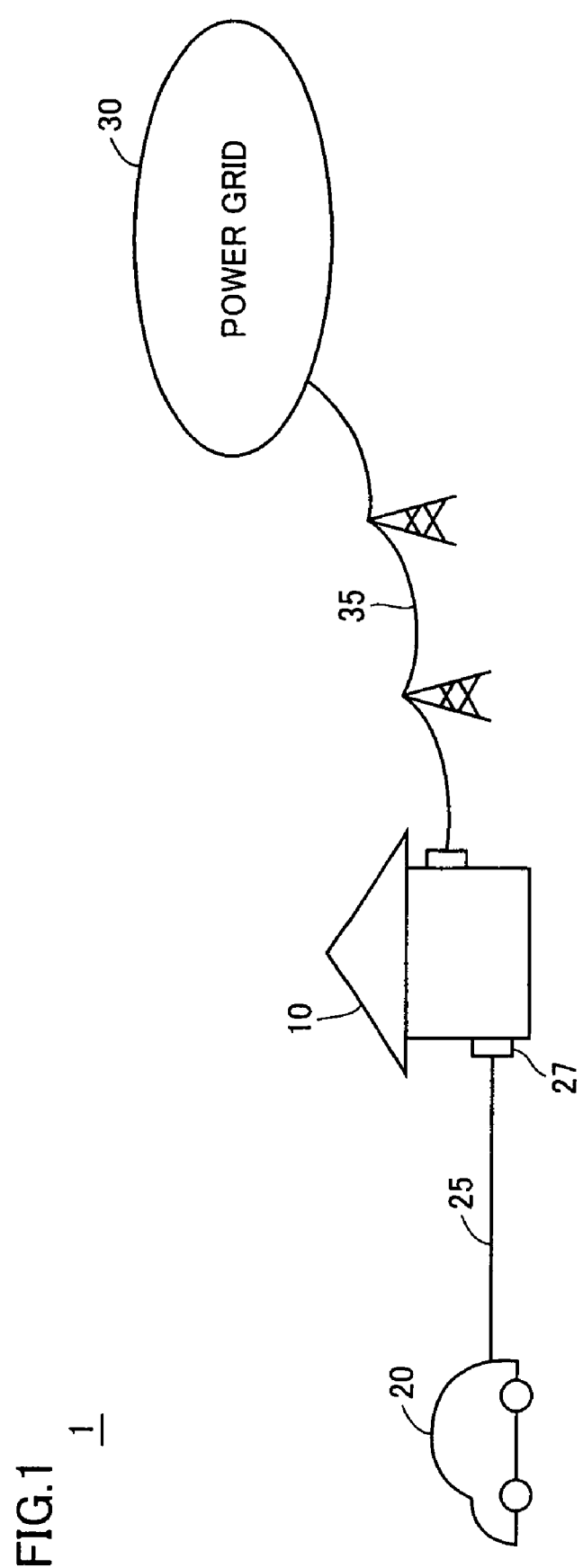
FIG. 1 is a schematic diagram of the power system in accordance with Embodiment 1 of the present invention.

In the following, embodiments of the present invention will be described in detail with reference to the figures. In the figures, the same or corresponding portions are denoted by the same reference characters and descriptions thereof will not be repeated.

Embodiment 1

FIG. 1 is a schematic diagram of the power system in accordance with Embodiment 1 of the present invention. Referring to FIG. 1, a power system 1 includes a house 10, a vehicle 20, a connection cable 25, a connector 27, a power grid 30 and a power transmission line 35.

House 10 is connected to power transmission line 35, and capable of transmitting/receiving electric power to/from power grid 30 through power transmission line 35. Further, house 10 is capable of transmitting/receiving electric power to/from vehicle 20 connected to house 10 through connection cable 25 and connector 27.

Vehicle 20 is an electrically driven vehicle having a power storage device installed as a DC power source and, by way of example, it is a hybrid vehicle or an electric vehicle. Vehicle 20 is electrically connected to house 10 by means of connection cable 25 and connector 27. Vehicle 20 is capable of generating commercial electric power and of supplying the electric power to house 10 by the method described later, and also capable of receiving electric power from house 10 and charging the power storage device. In other words, vehicle 20 functions as a power source for the house 10.

Connection cable 25 is a power line for electrically connecting vehicle 20 to house 10. Connector 27 is for electrically connecting connection cable 25 to a power line in the house 10.

Power grid 30 represents a commercial power supply system comprised of a large number of electric power generation facilities generating system power. To the power grid 30, various electric power generation facilities such as a thermal power plant, an atomic power plant, a wind power station, hydraulic power station and a photovoltaic station are connected.

Figure 2:
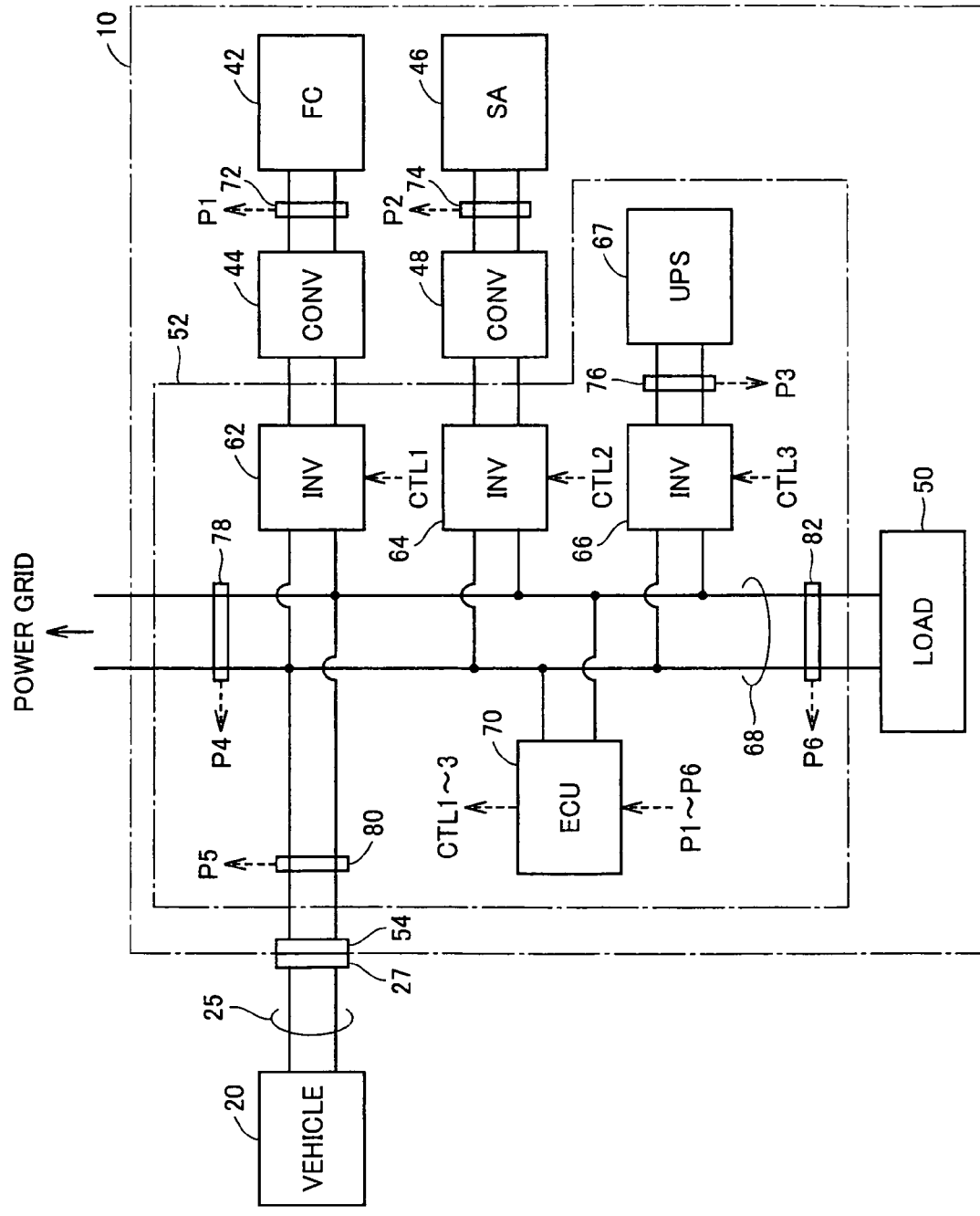
FIG. 2 is a block diagram showing a power system arrangement in the house shown in FIG. 1.

FIG. 2 is a block diagram showing a power system arrangement in house 10 shown in FIG. 1. Referring to FIG. 2, house 10 includes a fuel cell 42, a photovoltaic array 46, converters 44 and 48, house load 50, a power management station 52, a connector 54, and power sensors 72 and 74. Power management station 52 includes inverters 62, 64 and 66, an uninterruptible power supply system (hereinafter also referred to as "UPS") 67, a power line 68, an electronic control unit (hereinafter referred to as "ECU") 70, and power sensors 76, 78, 80 and 82.

Fuel cell 42, photovoltaic array 46 and UPS 67 are power source equipment provided in the house 10. Electric power output from fuel cell 42 and photovoltaic array 46 is voltage-converted by converters 44 and 48 and DC-AC converted by inverters 62 and 64, respectively, and supplied to power line 68. The electric power output from UPS 67 is DC-AC converted by inverter 66 and supplied to power line 68.

Connector 54 is electrically connected to power line 68. Then, connector 54 is connected to connector 27, so that vehicle 20 is electrically connected to power line 68 in the house 10, whereby vehicle 20 can be used as one of the power sources for the house 10, together with fuel cell 42, photovoltaic array 46 and UPS 67.

House load 50 generally represents electric loads in house 10, which operate receiving electric power supply from power line 68. Power line 68 is connected to house load 50 as well as to power grid 30 (not shown) through power transmission line 35.

Power sensors 72, 74 and 76 detect electric power supplied from fuel cell 42, photovoltaic array 46 and UPS 67, respectively, and output the detected values to ECU 70. Power sensor 78 detects electric power received and supplied between house 10 and power grid 30, and outputs the detected value to ECU 70. Power sensor 80 detects electric power received and supplied between house 10 and vehicle 20, and outputs the detected value to ECU 70. Power sensor 82 detects electric power consumed by house load 50, and outputs the detected value to ECU 70.

ECU 70 executes power management in house 10. Then, ECU 70 generates control signals CTL1 to CTL3 for driving inverters 62, 64 and 66, respectively, and outputs the generated control signals CTL1 to CTL3 to inverters 62, 64 and 66, respectively. Further, ECU 70 is connected to power line 68. ECU 70 generates a control signal instructing charge/discharge to vehicle 20 used as one power source for the house 10, and outputs the generated control signal to vehicle 20 through power line 68 and connection cable 25. In the following, structure and functions of ECU 70 will be described.

Figure 3:
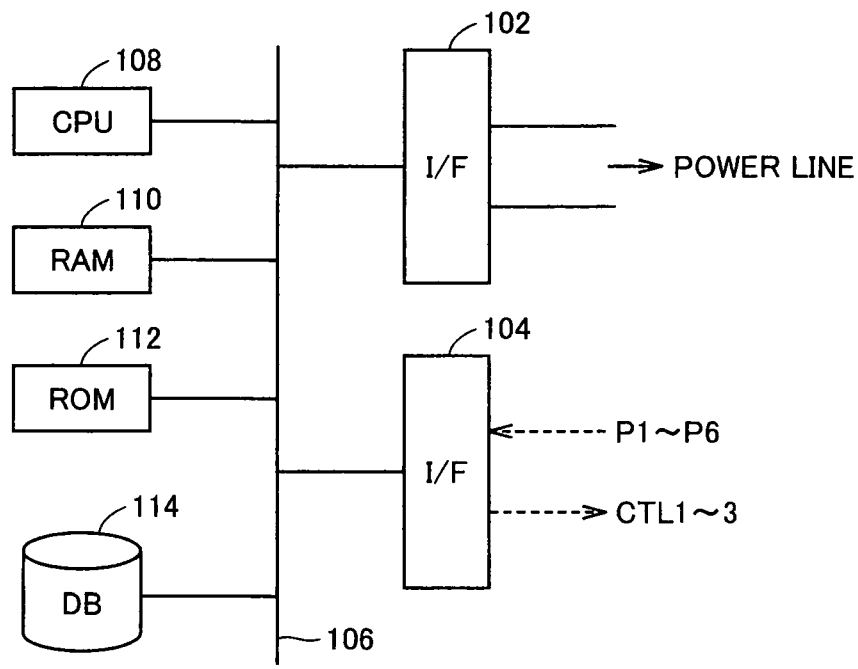
FIG. 3 shows hardware configuration of ECU shown in FIG. 2.

FIG. 3 shows a hardware configuration of ECU 70 shown in FIG. 2. Referring to FIG. 3, ECU 70 includes interface units 102 and 104, a data bus 106, a CPU (Central Processing Unit) 108, an RAM (Random Access Memory) 110, an ROM (Read Only Memory) 112, and a storage unit 114.

Interface unit 102 is connected to power line 68, and performs data communication with equipment (in Embodiment 1, vehicle 20) electrically connected to power line 68, through power line 68. Interface unit 104 exchanges signals to and from various power sensors and inverters 62, 64 and 66 shown in FIG. 2.

CPU 108 executes a process shown in a flowchart that will be described later, in accordance with a program stored in ROM 112. RAM 110 temporarily stores data when CPU 108 executes processes. ROM 112 stores a program executed by CPU 108.

Storage unit 114 is a rewritable non-volatile memory, and stores detected values from various power sensors shown in FIG. 2. Further, storage unit 114 stores external factor data acquired together with the detected values from the power sensors. Here, the external factor data represents data related to external factors that have influence on electric power supply from each of the power source facilities and electric power consumption by house load 50. For instance, the data includes day of the week, date and time, weather, and schedule of a resident of house 10. Storage unit 114 stores the detected values from respective power sensors in relation with the external factor data.

Figure 4:
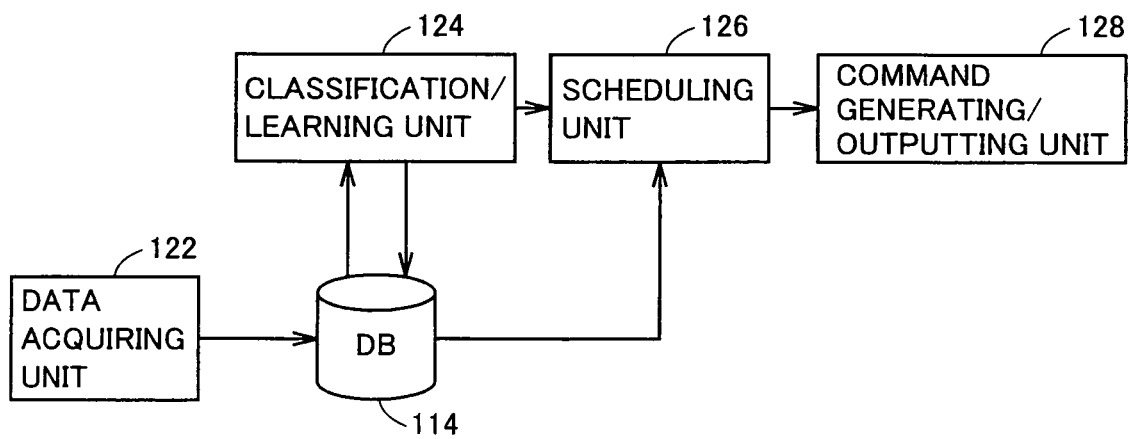
FIG. 4 is a block diagram functionally representing the configuration of ECU shown in FIG. 2.

FIG. 4 is a block diagram functionally showing the structure of ECU 70 shown in FIG. 2. Referring to FIG. 4, ECU 70 includes a data acquiring unit 112, a classification/learning unit 124, a scheduling unit 126, and a command generating/outputting unit 128.

Data acquiring unit 122 receives the detected values (electric power data) from various power sensors shown in FIG. 2. Further, data acquiring unit 122 acquires data of day of the week, date and time, weather, and schedule of the resident of house 10 (external factor data). The data related to day of the week or date and time may be acquired by a calendar function, and data related to weather may be acquired, for example, using an output from the photovoltaic array. Further, data related to the schedule of resident may be acquired by the schedule input by the resident. Data acquiring unit 122 outputs the electric power data in association with external factor data, to storage unit 114.

Classification/learning unit 124 reads the electric power data and the external factor data stored in storage unit 114 from storage unit 114, and classifies and learns the read data. Specifically, classification/learning unit 124 classifies the data acquired in time-sequence by data acquiring unit 122 to usable data, and learns the data. As to the method of classifying and learning data stored in storage unit 114, classification/learning techniques such as cluster analysis, Hidden Markov Model (HMM) or neural network (NN) may be used. Then, classification/learning unit 124 stores the classified and learned data to storage unit 114.

Scheduling unit 126 reads the data classified and learned by classification/learning unit 124, and predicts electric power demand of the current day of house 10 based on the external factor data of the current day. Specifically, scheduling unit 126 performs pattern matching between the external factor data of the current day with the classified/learned data stored in storage unit 114, and predicts electric power demand of the day in house 10. Then, scheduling unit 126 plans charging/discharging of vehicle 20 based on the predicted electric power demand, and outputs the result to command generating/outputting unit 128.

Command generating/outputting unit 128 generates a charge/discharge command of vehicle 20 in accordance with the charge/discharge schedule received from scheduling unit 126, and outputs the generated charge/discharge command to vehicle 20 through power line 68. The charge/discharge command corresponds to a control signal output from ECU 70 through power line 68 and connection cable 25 to vehicle 20.

Figure 5:
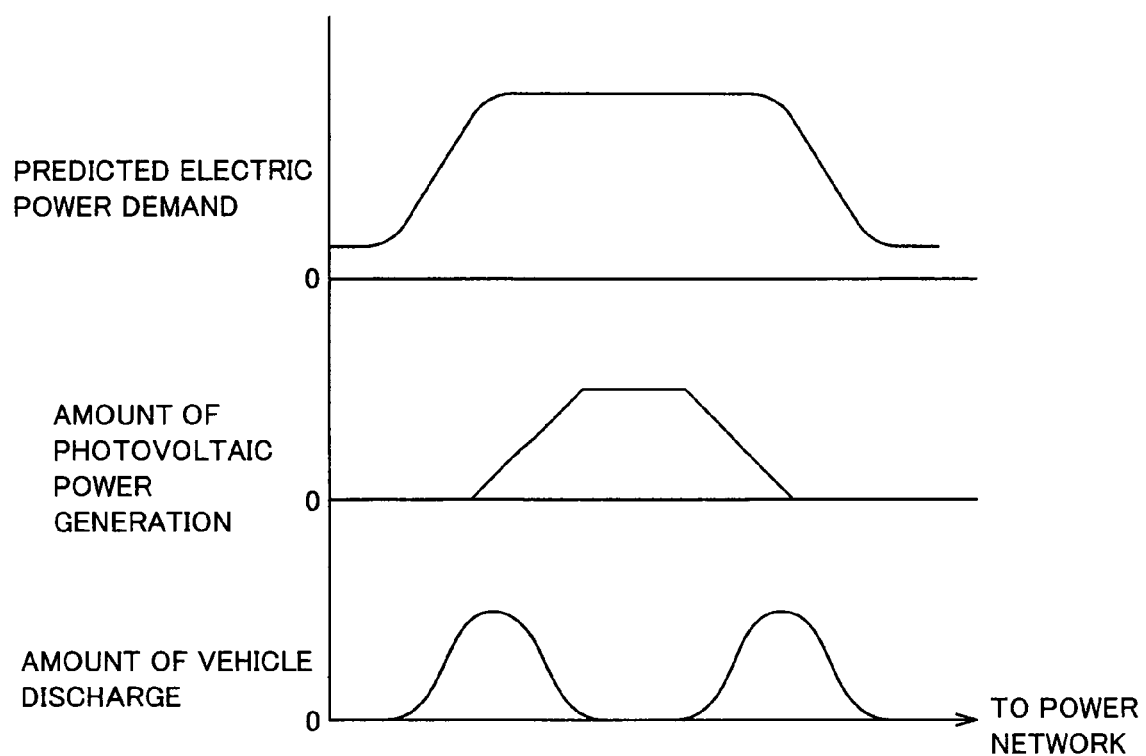
FIG. 5 shows an exemplary schedule for charging/discharging the vehicle.

FIG. 5 illustrates an exemplary charge/discharge schedule of vehicle 20. Referring to FIG. 5, electric power demand by house load 50 of one day is predicted by scheduling unit 126 (predicted electric power demand). Further, based on the external factor data of the current day, the amount of power generation (as shown) of photovoltaic cell 46 and amount of power generation (not shown) of fuel cell 42 are also predicted. Then, charge/discharge schedule of vehicle 20 is generated such that electric power is supplied from vehicle 20 to house 10 at the time of day (morning or after sunset) when predicted electric power demand is large and power generation by photovoltaic cell 42 is small.

Figure 6:
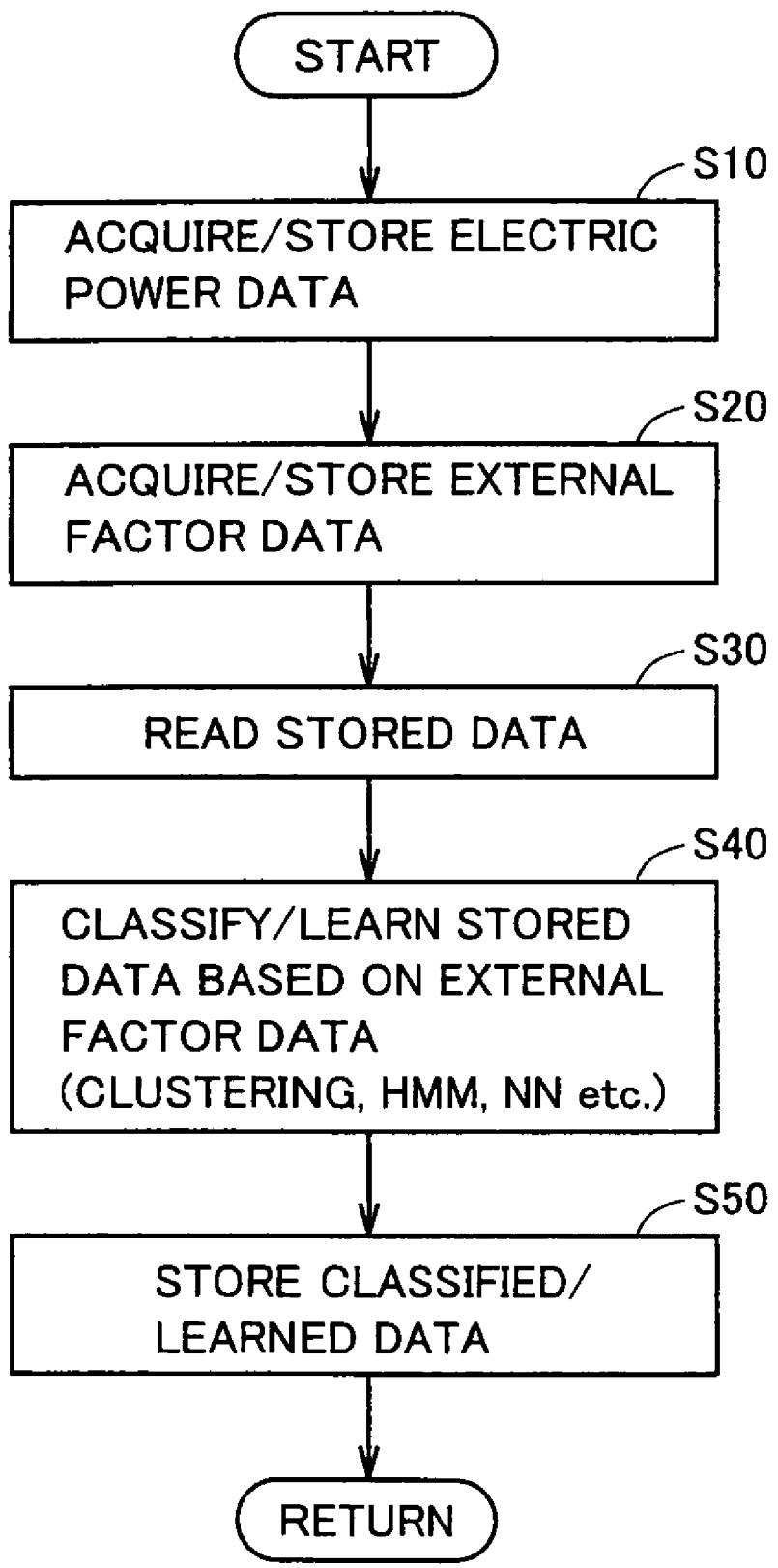
FIG. 6 is a flowchart of data acquisition/classification process executed by the ECU shown in FIG. 2.

FIG. 6 is a flowchart of data acquisition/classification process executed by ECU 70 shown in FIG. 2. The process of this flowchart is called from the main routine and executed at every prescribed interval or every time prescribed conditions are satisfied.

Referring to FIG. 6, ECU 70 receives electric power data from respective power sensors, and stores the received electric power data in storage unit 114 (step S10). Further, ECU 70 acquires external factor data (day of the week, date and time, weather, and schedule of a resident) in addition to the electric power data, and stores the acquired external factor data in association with the electric power data in storage unit 114 (step S20).

Thereafter, ECU 70 reads the electric power data and the external factor data stored in storage unit 114 (step S30), and classifies/learns the stored data using classification/learning technique such as clustering, Hidden Markov Model (HMM) or neural network (NN) (step S40). Then, ECU 70 stores the classified/learned data in storage unit 114 (step S50).

Figure 7:
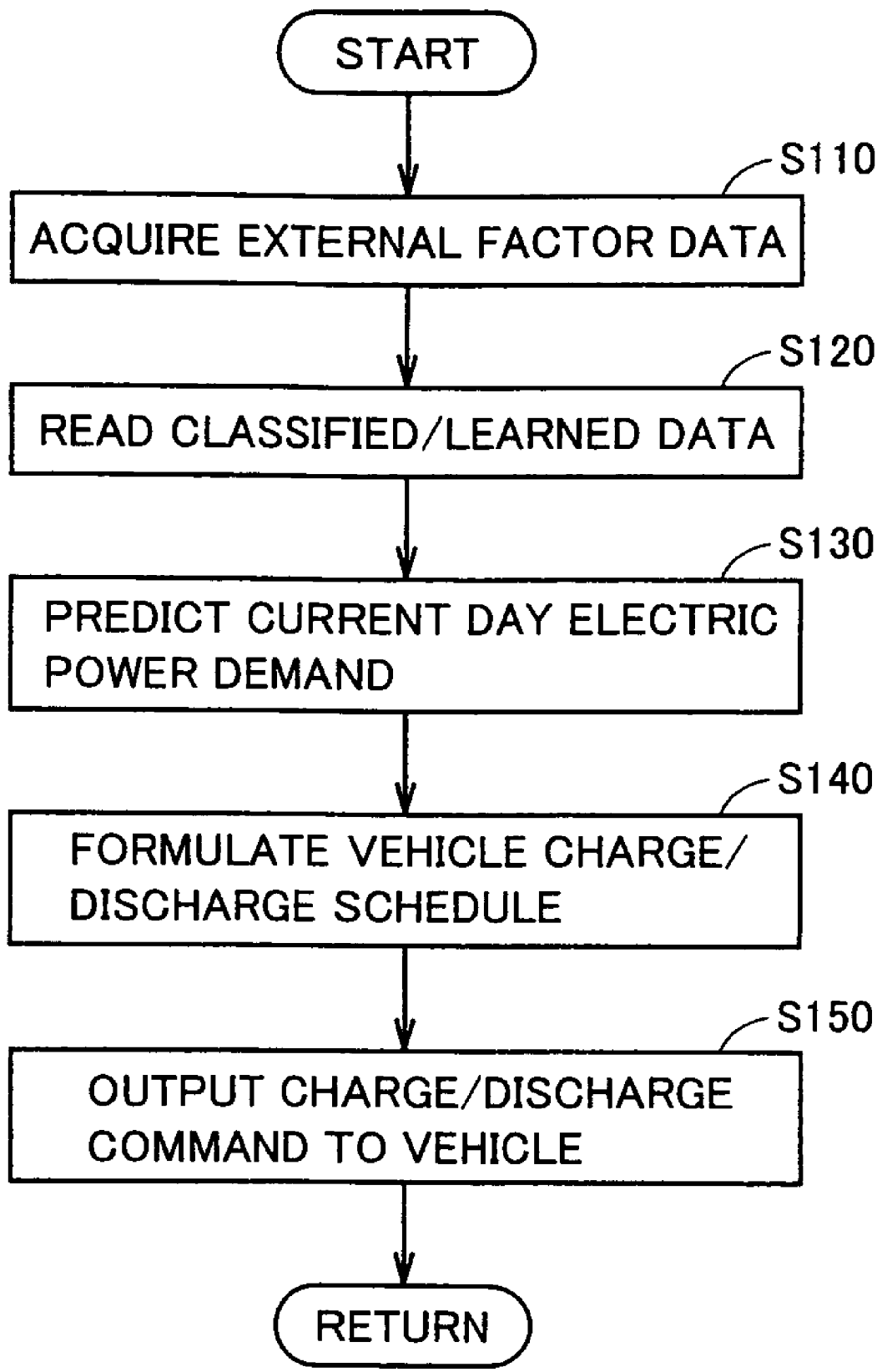
FIG. 7 is a flowchart of a scheduling process executed by the ECU shown in FIG. 2.

FIG. 7 is a flowchart of the scheduling process executed by ECU 70 shown in FIG. 2. The process of the flowchart is called from the main routine and executed when prescribed conditions are satisfied (for example, at a prescribed time set in advance).

Referring to FIG. 7, ECU 70 acquires external factor data at present time (step S110). Thereafter, ECU 70 reads the classified/learned data stored in storage unit 114 from storage unit 114 (step S120). Then, ECU 70 performs pattern matching between the acquired external factor data with the classified/learned data, and predicts electric power demand by the house of the current day (step S130).

Then, ECU 70 formulates a charge/discharge schedule of vehicle 20 based on the predicted electric power demand (step S140). When the charge/discharge schedule of vehicle 20 is formulated, ECU 70 outputs a charge/discharge command to vehicle 20 through power line 68 and connection cable 25, in accordance with the charge/discharge schedule (S150).

A charge command for charging vehicle 20 is output when the predicted electric power demand of house load 50 is small and it is possible to charge vehicle 20 by the power supplied from photovoltaic array 46 or fuel cell 42.

Figure 8:
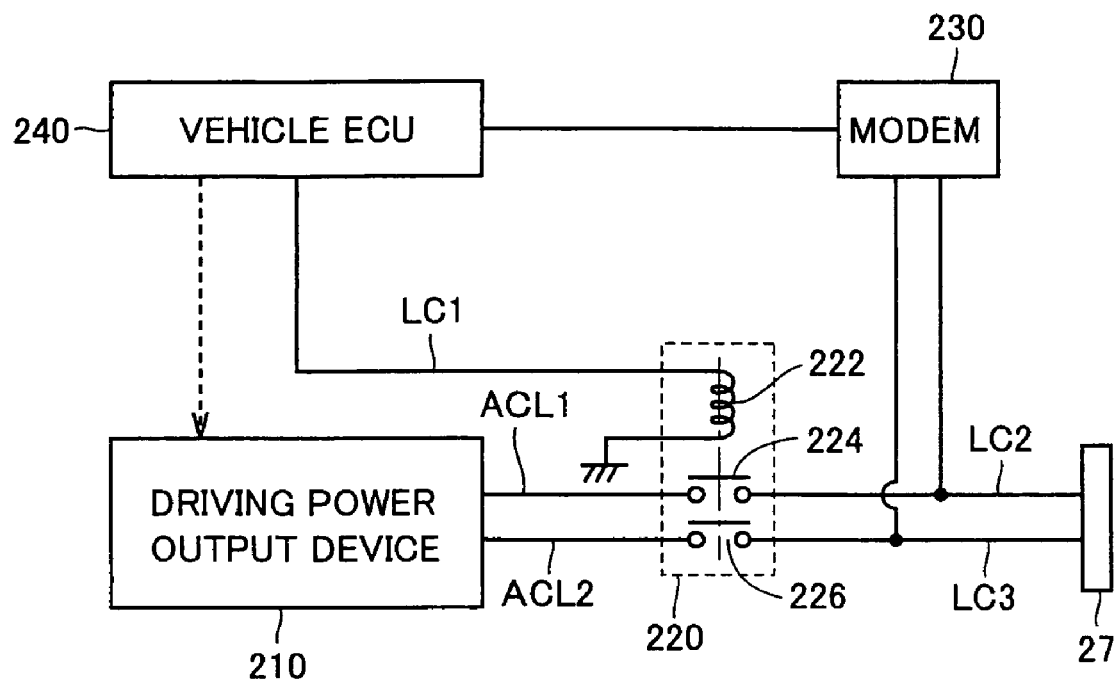
FIG. 8 shows a schematic configuration of the vehicle shown in FIG. 2.

FIG. 8 schematically shows the configuration of vehicle 20 shown in FIG. 2. Referring to FIG. 8, vehicle 20 includes a driving power output device 210, a relay circuit 220, a modem 230, a vehicle ECU 240, power lines ACL1 and ACL2, and power lines LC1 to LC3.

Driving power output device 210 is connected to power lines ACL1 and ACL2. Relay circuit 220 includes an electromagnetic coil 222 and switches 224 and 226. Electromagnetic coil 222 is connected between power line LC1 and a ground node. Switch 224 is connected between power lines ACL1 and LC2. Switch 226 is connected between power line ACL2 and LC3. Modem 230 is connected to power line LC2 and LC3. Vehicle ECU 240 is connected to power line LC1. Power lines LC2 and LC3 are connected to connector 27. Here, power lines LC2 and LC3 correspond to connection cable 25 shown in FIGS. 1 and 2.

Driving power output device 210 outputs the power for driving vehicle 20. Further, driving power output device 210 converts commercial power received from power lines ACL1 and ACL2 to DC power for charging the power storage device (not shown), and converts DC power from the power storage device to commercial power and outputs it to power lines ACL1 and ACL2, in accordance with a command from vehicle ECU 240. Configuration of driving power output device 210 will be described later.

Electromagnetic coil 222 generates magnetic power that acts on switches 224 and 226, when current is caused to flow from vehicle ECU 240 through power line LC1. Switches 224 and 226 operate, receiving the magnetic force from electromagnetic coil 222. Specifically, switches 224 and 226 turn on when current flows through electromagnetic coil 222, and turn off when no current flows through electromagnetic coil 222.

Modem 230 is a communication device for performing data communication to/from power management station 52 (not shown) in house 10, through power lines LC2 and LC3 and connecter 27.

Vehicle ECU 240 generates a torque command of a motor generator (not shown) included in driving power output device 210 when connector 27 is not connected to house 10 and running of vehicle is possible, and outputs the generated torque command to driving power output device 210.

Further, when connecter 27 is connected to house 10 and a control signal (charge/discharge signal) is received by modem 230 from the power management station, vehicle ECU 240 supplies current to power line LC1 to turn the relay circuit 220 on, and generates a command for controlling charge/discharge of driving power output device 210 and outputs the command to driving power output device 210.

Figure 9:
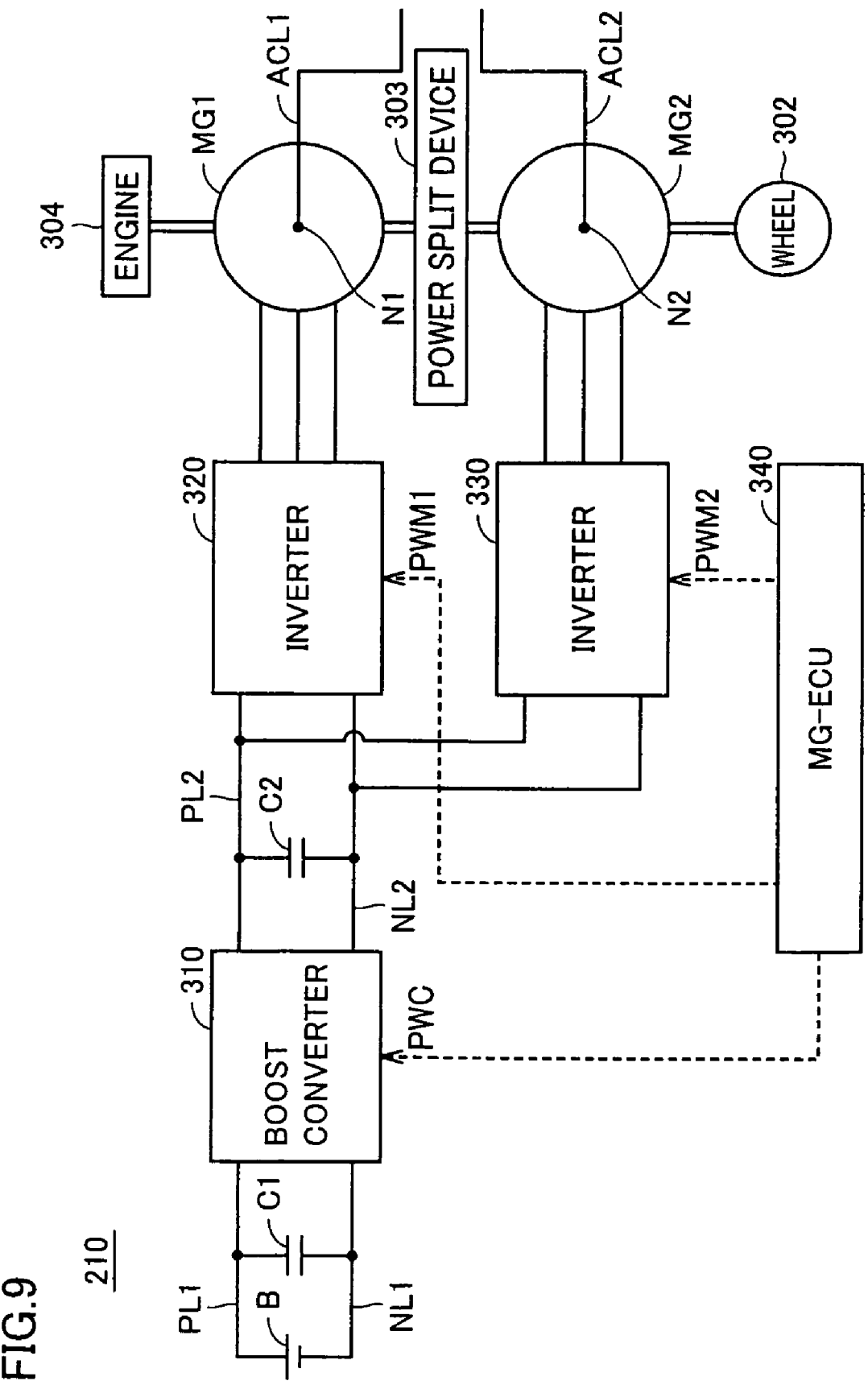
FIG. 9 is a functional block diagram of a driving power output device shown in FIG. 8.

FIG. 9 is a functional block diagram of driving power output device 210 shown in FIG. 8. Referring to FIG. 9, driving power output device 210 includes an engine 304, motor generators MG1 and MG2, a power split device 303, and wheels 302. Further, driving power output device 210 includes a power storage device B, a boost converter 310, inverters 320 and 330, an MG-ECU 340, capacitors C1 and C2, positive power lines PL1 and PL2, and negative power lines NL1 and NL2.

Power split device 303 is coupled to engine 304 and motor generators MG1 and MG2, and distributes motive power among these. By way of example, a planetary gear having three rotation shafts of sun gear, planetary carrier and ring gear may be used as power split device 303. The three rotation shafts are connected to engine 304 and rotation shafts of motor generators MG1 and MG2, respectively.

Motor generator MG1 is incorporated in diving power output device 210 as a generator driven by engine 304 and also as a motor that can start the operation of engine 304. Motor generator MG2 is incorporated in driving power output device 210 as a motor that drives wheel 302 as a driving wheel.

Each of motor generators MG1 and MG2 includes a Y-connected three-phase coil, not shown, as a stator coil. To a neutral point N1 of three-phase coil of motor generator MG1, power line ACL1 is connected, and to a neutral point N2 of three-phase coil of motor generator MG2, power line ACL2 is connected.

Power storage device B is a rechargeable DC power source and, by way of example, implemented by a secondary battery such as a nickel hydride or lithium ion secondary battery. Power storage device B outputs a DC power to boost converter 310. Further, power storage device B is charged receiving the electric power from boost converter 310. It is noted that a large capacity capacitor may be used as power storage device B.

Capacitor C1 smoothes voltage fluctuation between positive power line PL1 and negative power line NL1. Based on a signal PWC from MG-ECU 340, boost converter 310 boosts DC voltage received from power storage device B and outputs the boosted voltage to positive power line PL2. Further, based on the signal PWC, boost converter 310 lowers the DC voltage received from inverters 320 and 330 through positive power line PL2 to a voltage level of power storage device B and charges power storage device B. Boost converter 310 is formed, for example, by a step-up/step-down type chopper circuit.

Capacitor C2 smoothes voltage fluctuation between positive power line PL2 and negative power line NL2. Based on a signal PWM1 from MG-ECU 340, inverter 320 converts DC voltage received from positive power line PL2 to three-phase AC voltage, and outputs the converted three-phase AC voltage to motor generator MG1. Further, inverter 320 converts the three-phase AC voltage generated by motor generator MG1 receiving an output of engine 304 to a DC voltage based on the signal PWM1, and outputs the converted DC voltage to positive power line PL2.

Based on a signal PWM2 from MG-ECU 340, inverter 330 converts the DC voltage received from positive power line PL2 to three-phase AC voltage, and outputs the converted AC voltage to motor generator MG2. Thus, motor generator MG2 is driven to generate the designated torque. Further, at the time of regenerative braking of the vehicle, inverter 330 converts the three-phase AC voltage generated by motor generator MG2 receiving rotational force from wheel 302 to a DC voltage based on the signal PWM2, and outputs the converted DC voltage to positive power line PL2.

Further, when electric power is supplied from vehicle 20 to house 10, inverters 320 and 330 generate AC voltage having the frequency of commercial power supply across neutral points N1 and N2, based on signals PWM1 and PWM2. Further, when power storage device B is charged using commercial power supplied from house 10, inverters 320 and 330 convert commercial power applied to neutral points N1 and N2 to DC power based on signals PWM1 and PWM2, and output the converted DC power to positive power line PL2.

Motor generators MG1 and MG2 are three-phase AC generators formed, for example, of three-phase AC synchronous motors. Motor generator MG1 generates a three-phase AC voltage using an output of engine 304, and outputs the generated three-phase AC voltage to inverter 320. Further, motor generator MG1 generates driving force by the three-phase AC voltage received from inverter 320, and starts operation of engine 304. Motor generator MG2 generates driving torque of the vehicle by the three-phase AC voltage received from inverter 330. Further, motor generator MG2 generates a three-phase AC voltage and outputs it to inverter 330 at the time of regenerative braking of the vehicle.

MG-ECU 340 generates the signal PWC for driving boost converter 310 and signals PWM1 and PWM2 for driving inverters 320 and 330, respectively, and outputs the generated signals PWC, PWM1 and PWM2 to boost converter 310 and inverters 320 and 330, respectively.

Here, MG-ECU 340 generates signals PWM1 and PWM2 for controlling inverters 320 and 330, respectively, such that an AC voltage having the frequency of commercial power generates across neutral points N1 and N2, when electric power is to be supplied from vehicle 20 to house 10. Further, MG-ECU 340 generates signals PWM1, PWM2 and PWC for controlling inverters 320 and 330 and boost converter 310, respectively, such that the commercial power applied to neutral points N1 and N2 is converted to DC power to charge power storage device B, when charging power is applied from house 10 through power lines ACL1 and ACL2 to neutral points N1 and N2.

Figure 10:
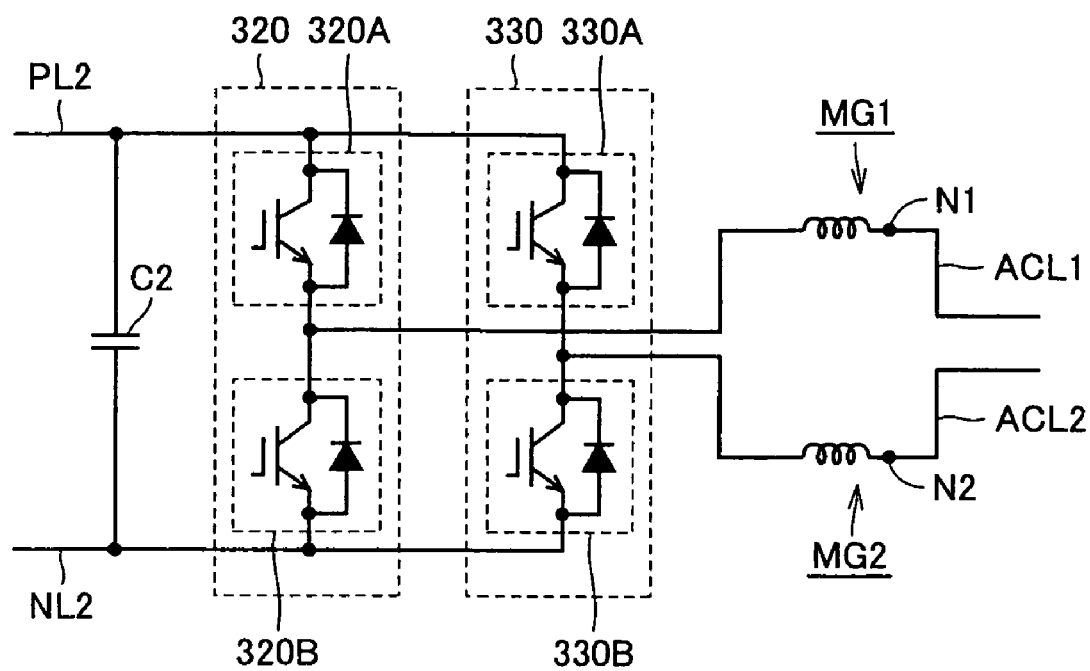
FIG. 10 shows a zero-phase equivalent circuit of the inverter and the motor generator shown in FIG. 9.

FIG. 10 is a zero-phase equivalent circuit of inverters 320 and 330 and motor generators MG1 and MG2 shown in FIG. 9. In each of inverters 320 and 330 as three-phase inverters, there are 8 different patterns for combining on/off of six transistors. Among the eight switching patterns, two have zero interphase voltage, and such voltage state is referred to as zero voltage vector. For the zero voltage vector, three transistors of the upper arm can be regarded as in the same switching state (all on or all off), and three transistors of the lower arm can also be regarded as in the same switching state. Therefore, in FIG. 10, three transistors of the upper arm of inverter 320 are collectively represented as upper arm 320A, and three transistors of the lower arm of inverter 320 are collectively represented as lower arm 320B. Similarly, three transistors of the upper arm of inverter 330 are collectively represented as upper arm 330A, and three transistors of the lower arm of inverter 330 are collectively represented as lower arm 330B.

As shown in FIG. 10, the zero-phase equivalent circuit may be regarded as a single-phase PWM inverter that generates a single-phase AC voltage across neutral points N1 and N2 using the DC voltage supplied from positive power line PL2. Further, the zero-phase equivalent circuit may also be regarded as a single-phase PWM converter that receives as an input single-phase AC commercial power applied to neutral points N1 and N2 through power lines ACL1 and ACL2. Therefore, by changing zero voltage vector in each of inverters 320 and 330 and thereby switching control of inverters 320 and 330 such that the inverters operate as arms of respective phases of single-phase PWM converter or single-phase PWM inverter, it is possible to convert the DC power from positive power line PL2 to AC power and to output it to power lines ACL1 and ACL2, and it is possible to convert AC commercial power input from power lines ACL1 and ACL2 to DC power and to output it to positive power line PL2.

As described above, in Embodiment 1, power management station 52 stores electric power data of house 10 and, in addition, stores data related to external factors (external factor data) that may influence power increase/decrease. Based on the stored data, power management station 52 controls charge/discharge of vehicle 20 electrically connected to house 10. Therefore, according to Embodiment 1, power management taking into consideration the state of power supply and power demand of house 10 can be realized. As a result, power supply and power demand of house 10 and vehicle 20 can be optimized.

Further, the stored electric power data and external factor data are classified/learned using a technique such as cluster analysis, hidden Markov model or neural network and used thereafter. Therefore, highly accurate power management becomes possible.

Embodiment 2

In Embodiment 2, power management using information of power grid is executed.

Figure 11:
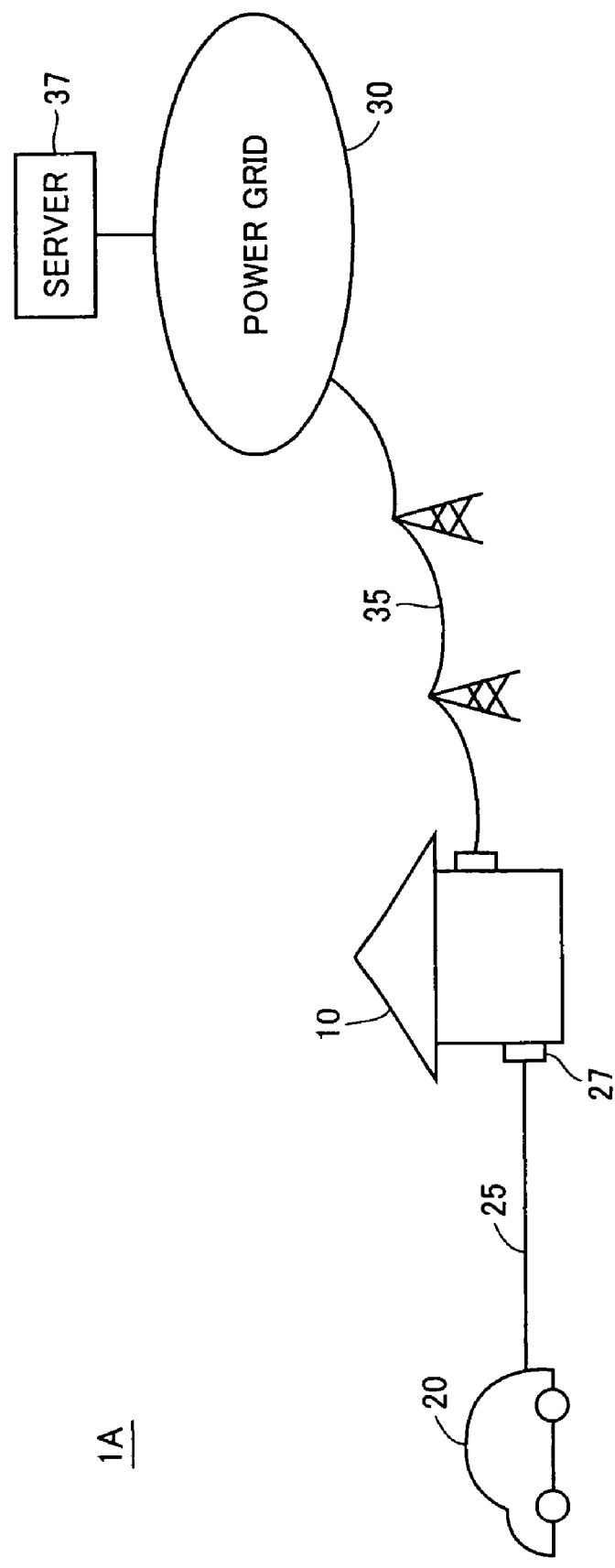
FIG. 11 is a schematic diagram of a power system in accordance with Embodiment 2.

FIG. 11 is a schematic diagram of a power system in accordance with Embodiment 2. Referring to FIG. 11, a power system 1A includes a server 37, in addition to the configuration of power system 1 shown in FIG. 1. Server 37 is connected to a power network forming power grid 30, and it forms electric power information of power grid 30 and outputs it to the power network.

The electric power information includes amount of carbon dioxide ($CO_2$) emitted when electric power is generated in power grid 30 (for example, amount of $CO_2$ emitted when commercial power of 1 kwh is generated), and information related to electric power cost. Generally, amount of $CO_2$ emission is the largest in thermal power generation among other methods of power generation, and if the ratio of power generated by thermal power generation is high in power grid 30, $CO_2$ emission is high.

The electric power information of power grid 30 output from server 37 is received by power management station 52 in house 10 through power transmission line 35.

Figure 12:
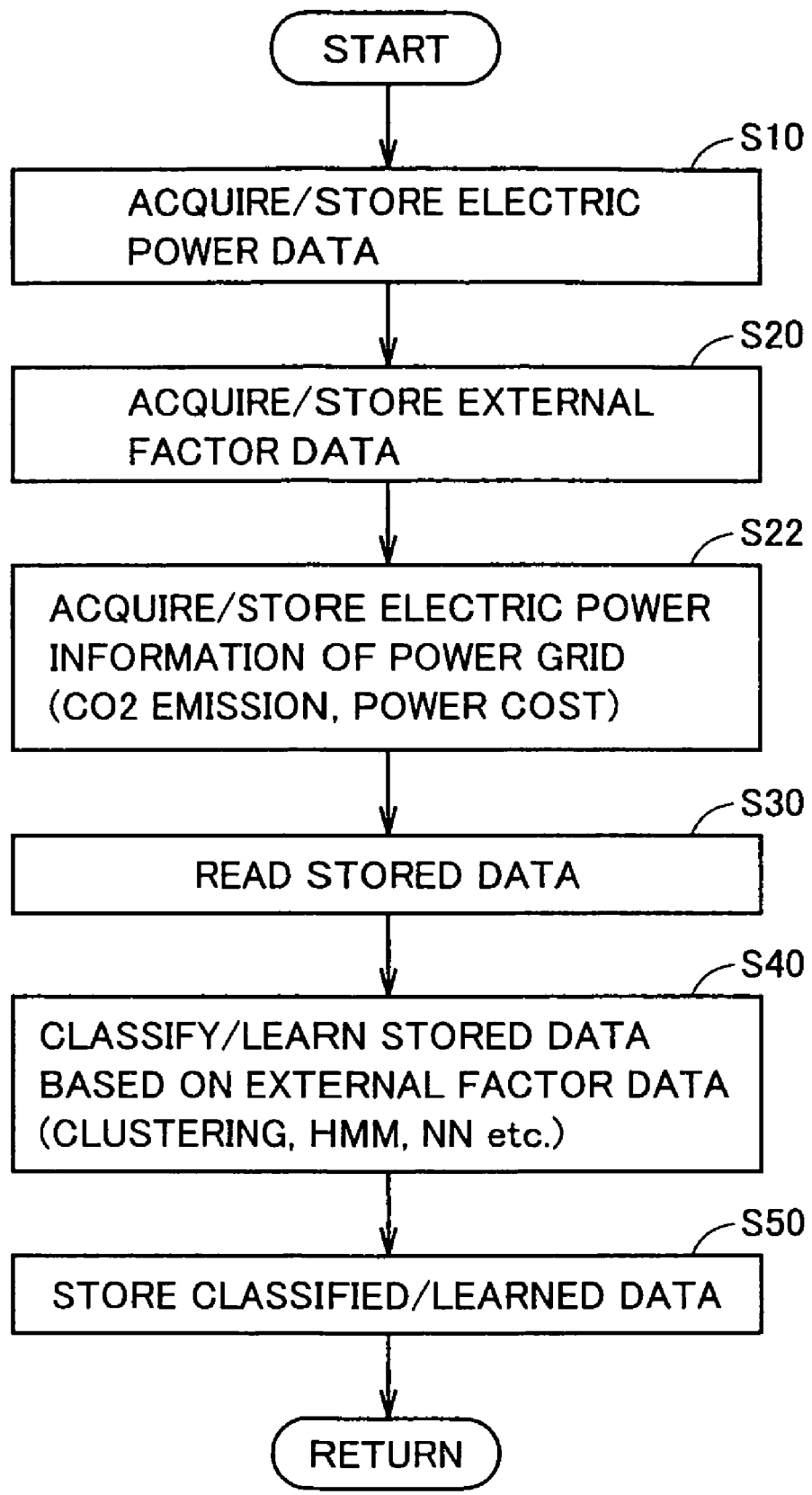
FIG. 12 is a flowchart of data acquisition/classification process executed by the ECU of a power management station in accordance with Embodiment 2.

FIG. 12 is a flowchart of data acquisition/classification process executed by the ECU of power management station in accordance with Embodiment 2. The process of this flowchart is also called from the main routine and executed at every prescribed time interval or every time prescribed conditions are satisfied.

Referring to FIG. 12, the process shown in the flowchart includes step S22, in addition to the process shown in FIG. 6. Specifically, when the external factor data is acquired at step S20, ECU 70 further acquires the electric power information of power grid 30 transmitted from server 37 through power transmission line 35, and stores the acquired electric power information in storage unit 114 (step S22).

Figure 13:
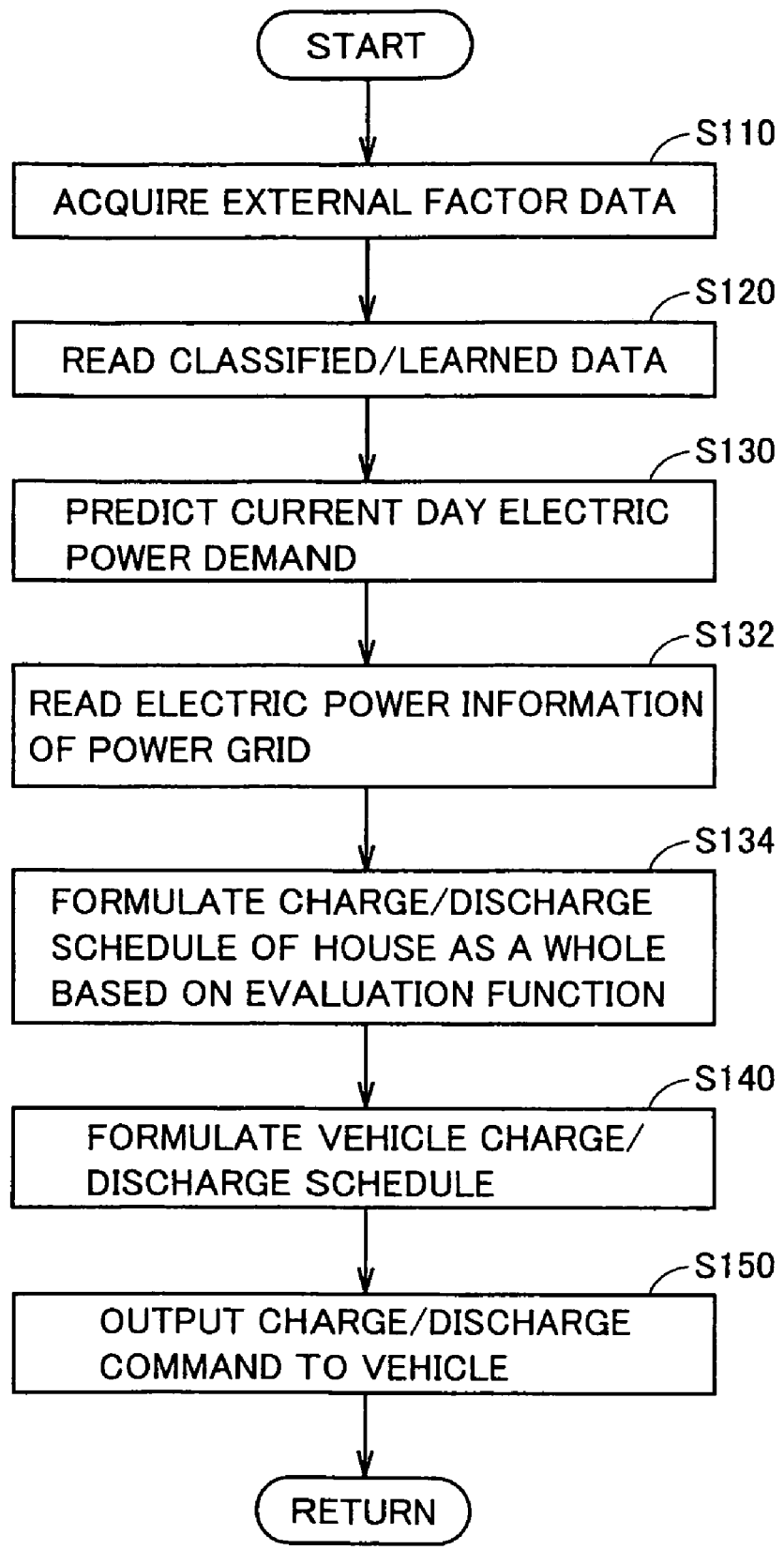
FIG. 13 is a flowchart of a scheduling process executed by the ECU of the power management station in accordance with Embodiment 2.

FIG. 13 is a flowchart of a scheduling process executed by the ECU of power management station in accordance with Embodiment 2. Referring to FIG. 13, the process shown in the flowchart includes steps S132 and S134, in addition to the process shown in FIG. 7. Specifically, when the electric power demand of house load 50 of the current day is predicted at step S130, ECU 70 reads the electric power information of power grid 30 from storage unit 114 (step S132).

Then, based on a preset evaluation function, ECU 70 formulates a charge/discharge schedule for the house as a whole (step S134). Specifically, ECU 70 determines whether electric power is to be purchased from power grid 30 or to sell electric power to power grid 30 for the house as a whole, based on the acquired electric power information of power grid 30, using the evaluation function having, as evaluation items, power cost and appropriately weighted amount of $CO_2$ emission.

After the charge/discharge schedule for the house as a whole is formulated, based on the formulated schedule, the charge/discharge schedule of vehicle 20 is formulated at step S140.

As described above, in Embodiment 2, the charge/discharge schedule of the house as a whole is formulated in consideration of electric power information (amount of $CO_2$ emission and power cost) of power grid 30, and based on the schedule, the charge/discharge schedule of vehicle 20 is formulated. Therefore, Embodiment 2 helps reduce $CO_2$ emission and power cost.

Modification of Embodiment 2

In Embodiment 2, the charge/discharge schedule of the house as a whole is formulated each time, based on the electric power information of power grid. In the present modification, an electric power generation plan of the power grid is acquired in advance by the power management station, and the charge/discharge of the house and of the vehicle is planned such that daily total $CO_2$ emission and power cost are minimized.

Figure 14:
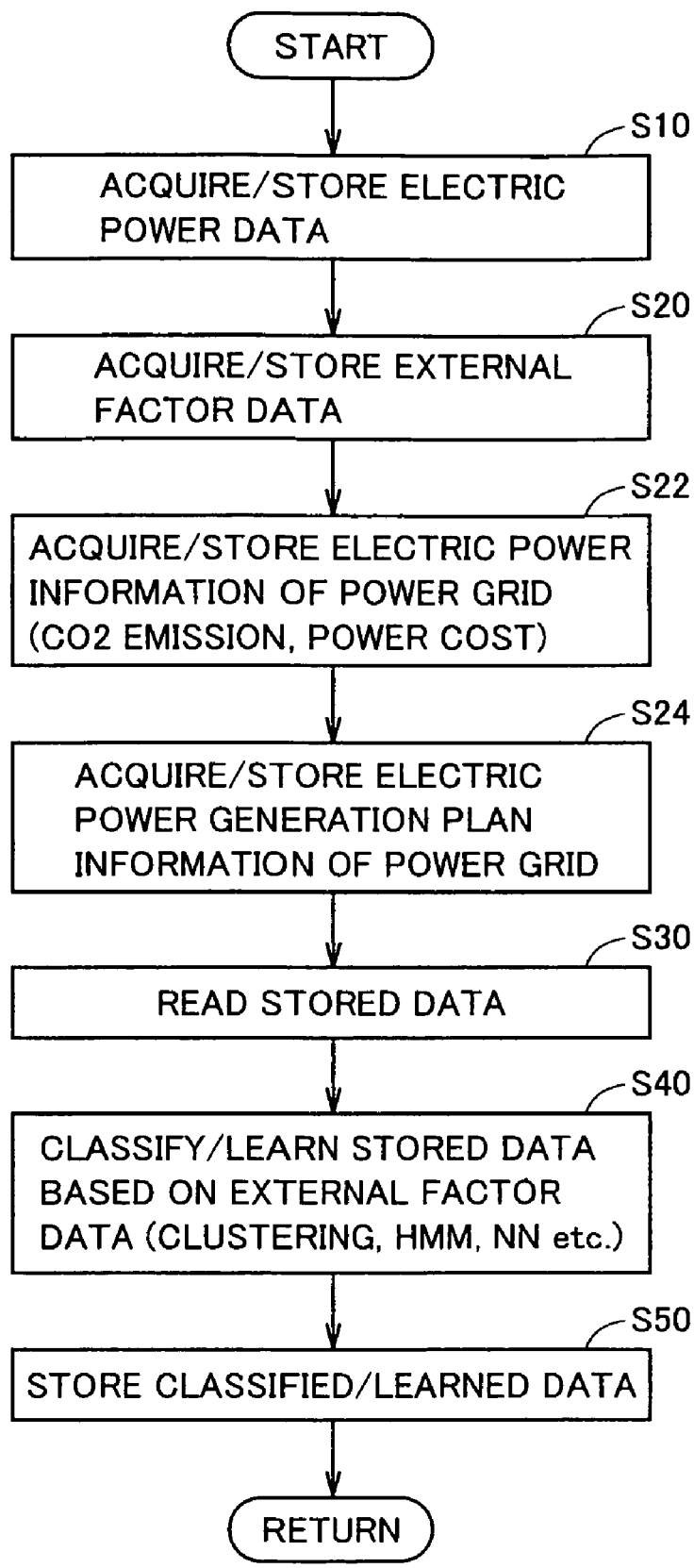
FIG. 14 is a flowchart of data acquisition/classification process executed by the ECU of a power management station in accordance with a modification of Embodiment 2.
Figure 15:
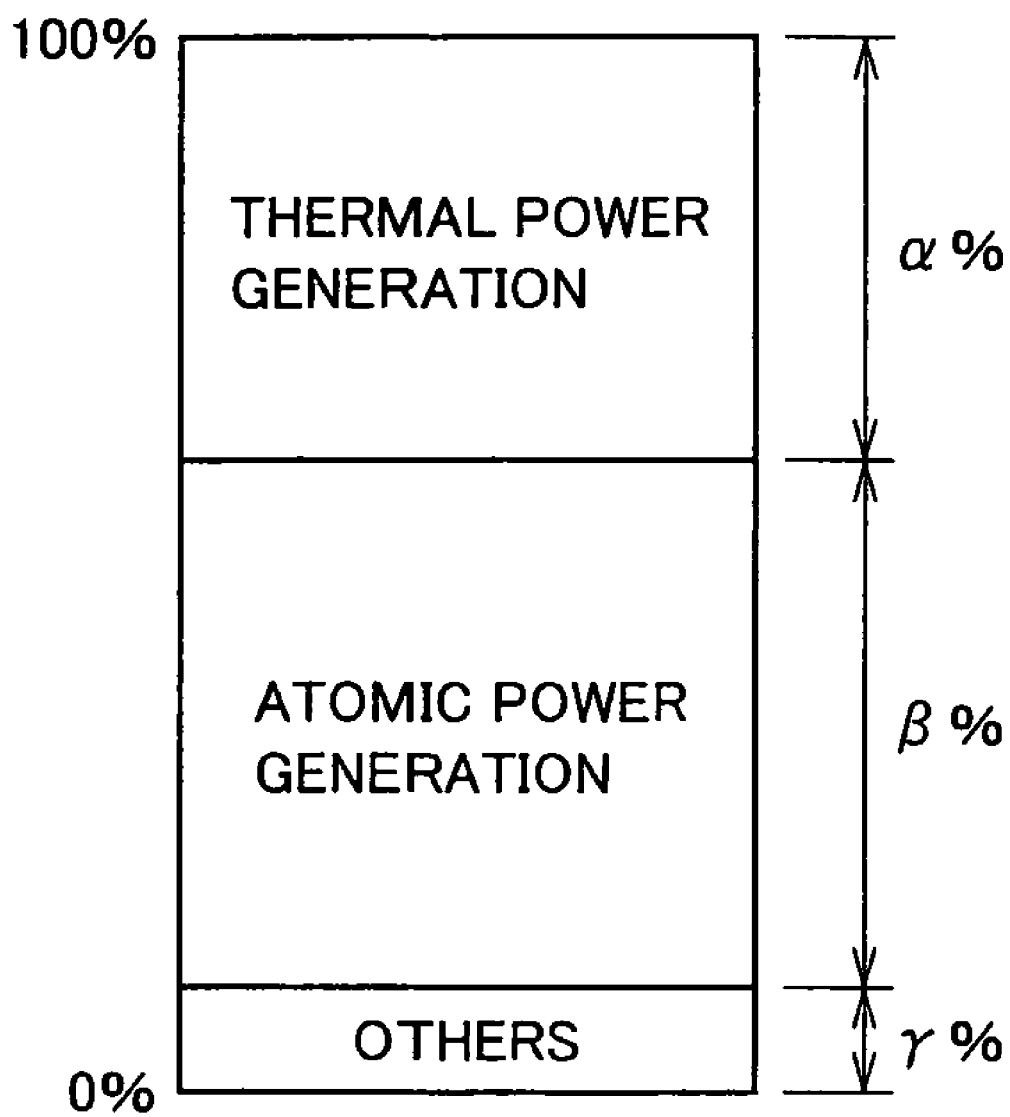
FIG. 15 shows ratio of electric power generated by various power generation methods in a commercial electric power.

FIG. 14 is a flowchart of data acquisition/classification process executed by the ECU of power management station in accordance with the modification of Embodiment 2. The process of this flowchart is also called from the main routine and executed at every prescribed time interval or every time prescribed conditions are satisfied.

Referring to FIG. 14, the process shown in the flowchart further includes step S24, in the process shown in FIG. 12. Specifically, when the electric power information of power grid 30 is acquired at step S22, ECU 70 acquires electric power generation plan information of power grid 30 from server 37, and stores the acquired electric power generation plan information in storage unit 114 (step S24). The electric power generation plan information of power grid 30 includes, by way of example, information related to the ratio of thermal power generation, atomic power generation and other methods of power generation in the electric power supplied to the power network of power grid 30.

Figure 16:
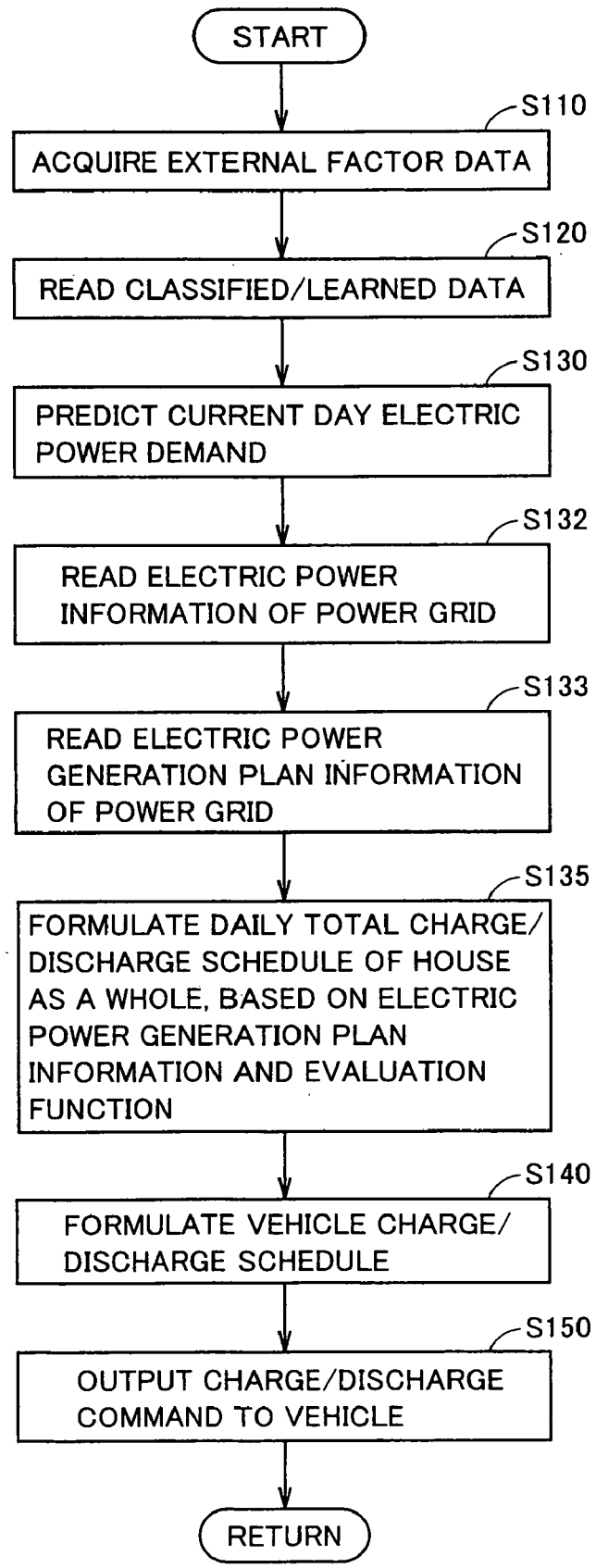
FIG. 16 is a flowchart of a scheduling process executed by the ECU of the power management station in accordance with a modification of Embodiment 2.

FIG. 16 is a flowchart of a scheduling process executed by the ECU of power management station in accordance with Embodiment 2. The process of the flowchart is also called from the main routine and executed when prescribed conditions are satisfied (for example, at a prescribed time set in advance).

Referring to FIG. 16, the process shown in the flowchart further includes step S133 in the process shown in FIG. 13, and includes step S135 in place of step S134. Specifically, when the electric power information of power grid 30 is read from storage unit 114 at step S132, ECU 70 further reads the electric power generation plan information of power grid 30 from storage unit 114 (step S133).

Then, ECU 70 formulates the charge/discharge schedule of the house as a whole such that daily total evaluation is optimized, based on a preset evaluation function and the read electric power generation plan information (step S135). Specifically, ECU 70 formulates the charge/discharge schedule of the house as a whole such that daily total evaluation is optimized, based on the electric power generation plan information of power grid 30, using the evaluation function having, as evaluation items, power cost and appropriately weighted amount of CO2 emission.

After the charge/discharge schedule for the house as a whole is formulated, based on the formulated schedule, the charge/discharge schedule of vehicle 20 is formulated at step S140.

As described above, the modification of Embodiment 2 more generally helps to reduce CO2 emission and power cost.

Embodiment 3

In Embodiment 3, power management strategy can be set by the user, in accordance with the schedule of use of the vehicle.

Figure 17:
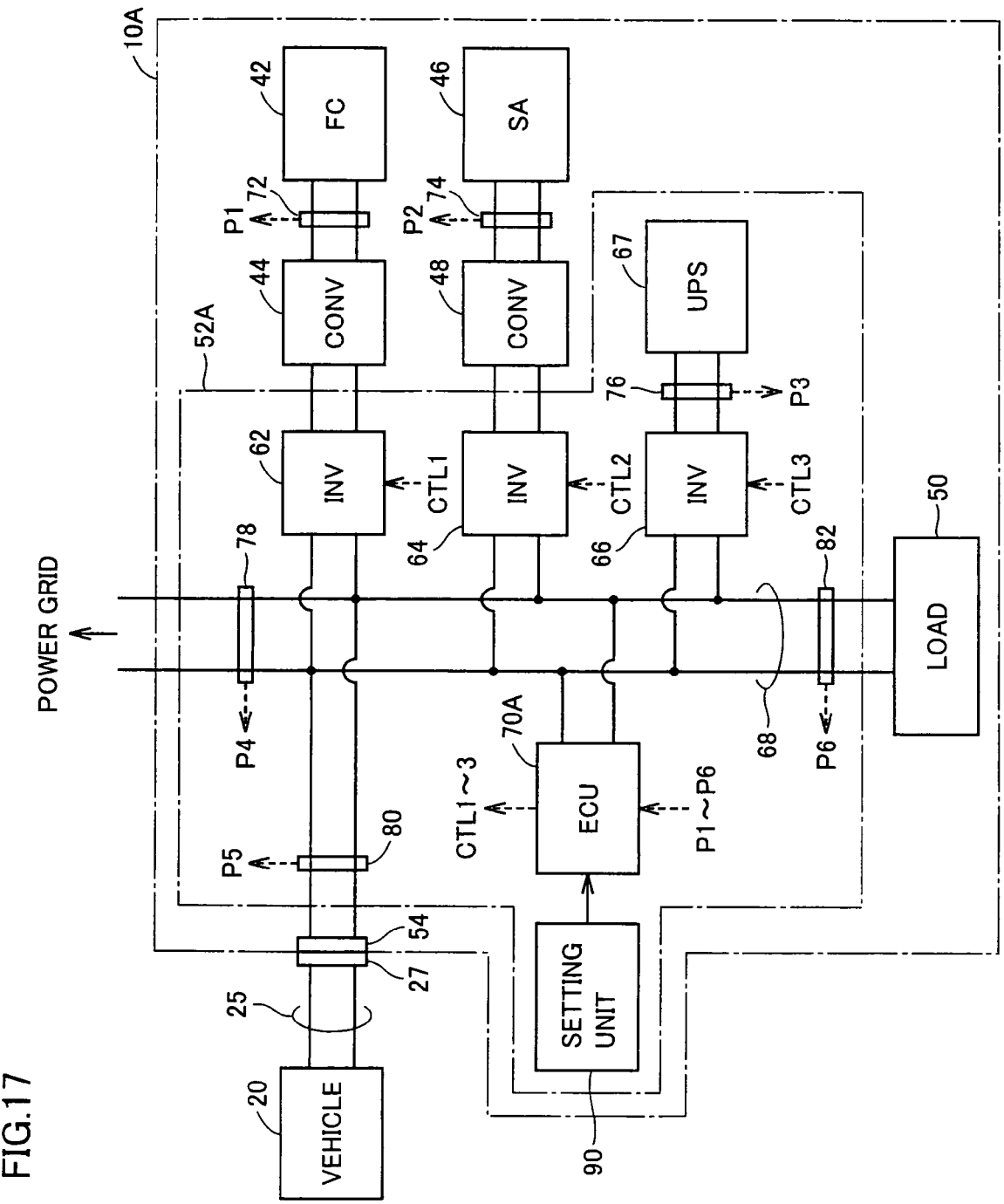
FIG. 17 is a block diagram showing a power system arrangement in a house in accordance with Embodiment 3.

FIG. 17 is a block diagram showing a power system arrangement in a house in accordance with Embodiment 3.

Referring to FIG. 17, house 10A includes a power management station 52A in place of power management station 52, in the configuration of house 10 in accordance with Embodiment 1 shown in FIG. 2. Power management station 52A includes a setting unit 90 in addition to the configuration of power management station 52, and includes an ECU 70A in place of ECU 70.

Setting unit 90 is an input device allowing the user to set a strategy in formulating the charge/discharge schedule of vehicle 20 used as a power source for house 10. Specifically, by setting unit 90, the user may select a saving mode, a running-focused mode and a positive charging mode, in accordance with the schedule of use of vehicle 20. Here, the saving mode refers to a mode in which electric power is positively supplied from vehicle 20 to house 10. The running-focused mode refers to a mode in which the state of charge (SOC) of power storage device in vehicle 20 is kept high, and the positive charging mode refers to a mode in which charging from house 10 to vehicle 20 starts as soon as the vehicle 20 is connected to house 10.

ECU 70A formulates the charge/discharge schedule of vehicle 20 in accordance with the mode set by setting unit 90. Other functions of ECU 70A are the same as those of ECU 70 in accordance with Embodiment 1.

Figure 18:
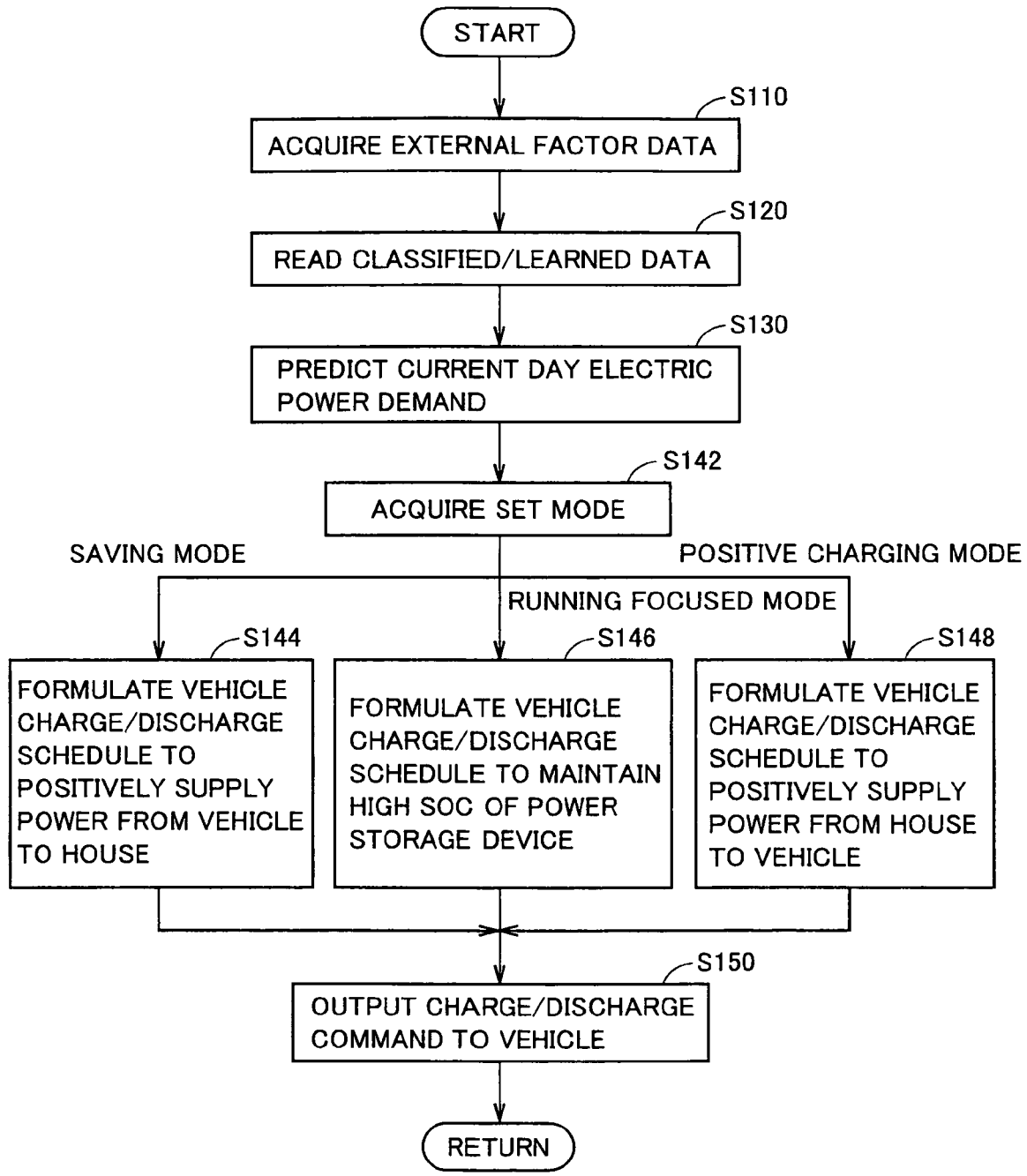
FIG. 18 is a flowchart of a scheduling process executed by the ECU shown in FIG. 17.

FIG. 18 is a flowchart of a scheduling process executed by the ECU 70A shown in FIG. 17. Referring to FIG. 18, the process shown in the flowchart includes steps S142, S144, S146 and S148, in place of step S140 of the process shown in FIG. 7.

Specifically, when the electric power demand of the current day is predicted at step S130, ECU 70A acquires the mode set by the user at setting unit 90, from setting unit 90 (step S142). If the saving mode is set, ECU 70A formulates the charge/discharge schedule of vehicle 20 such that electric power is positively supplied from vehicle 20 to house 10 (step S144).

When the running-focused mode is set, ECU 70A formulates the charge/discharge schedule of vehicle 20 such that SOC of power storage device B of vehicle 20 is kept high (step S146). Here, in response to a request from power management station 52A, SOC of power storage device B is transmitted from vehicle 20 to power management station 52A through connection cable 25, and SOC of power storage device B is monitored at power management station 52A.

Further, when the positive charging mode is set, ECU 70A formulates the charge/discharge schedule of vehicle 20 such that electric power is positively supplied from house 10 to vehicle 20 (step S148).

After the charge/discharge schedule of vehicle 20 is formulated, a charge/discharge command is output to vehicle 20 at step S150.

In the foregoing, setting unit 90 is provided at power management station 52A. The setting unit, however, may be provided on the side of the vehicle 20, and the set mode may be transmitted to the power management station through connection cable 25.

As described above, according to Embodiment 3, by the provision of setting unit 90, it becomes possible for the user to determine strategy in power management, in accordance with the schedule of use of vehicle 20.

Embodiment 4

In Embodiment 4, a state of connection of connector connecting the vehicle to the house is monitored by the power management station, and using connection/disconnection of the vehicle as a trigger, power source equipment and house load are activated/inactivated.

Figure 19:
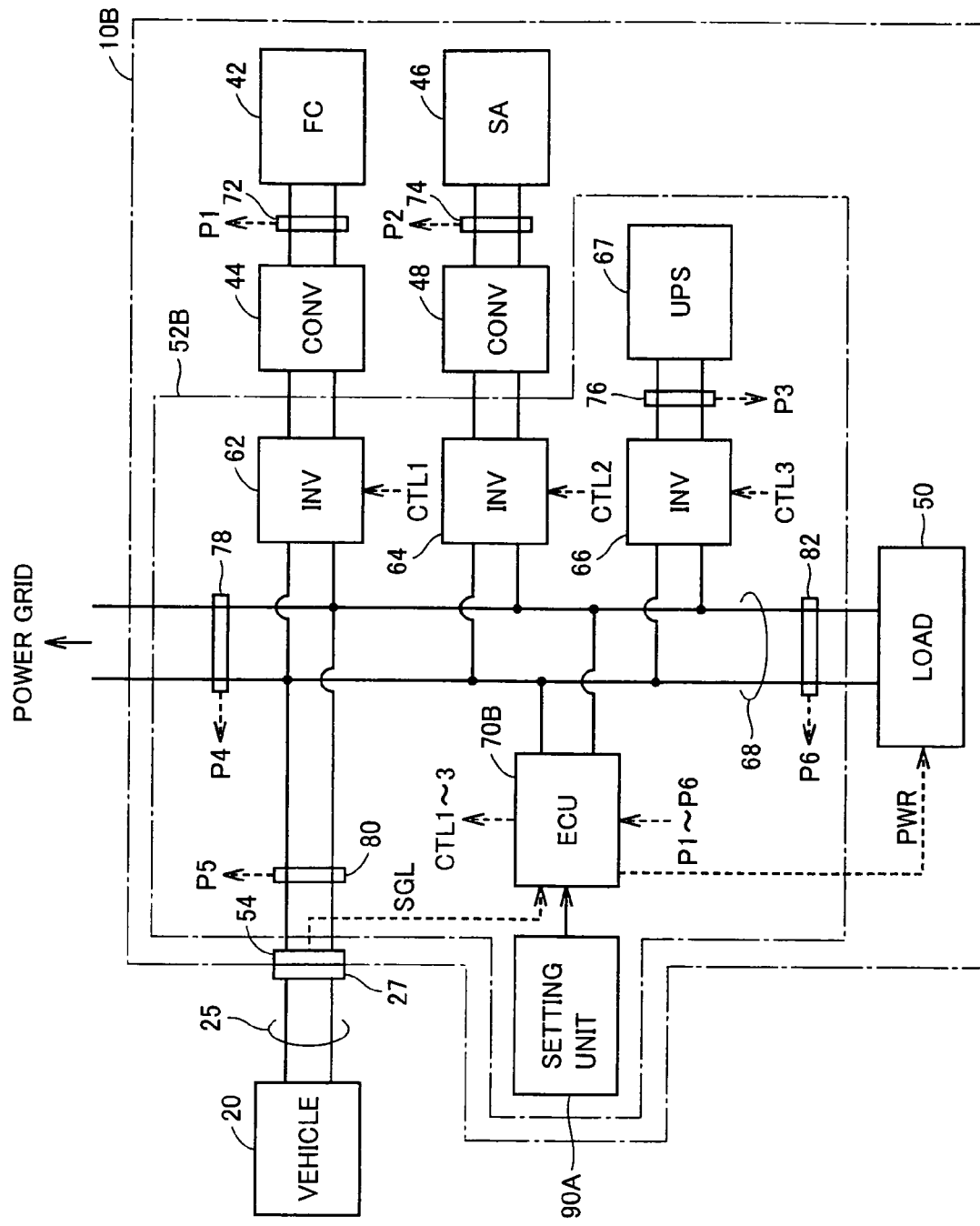
FIG. 19 is a block diagram showing a power system arrangement in a house in accordance with Embodiment 4.

FIG. 19 is a block diagram showing a power system arrangement in a house in accordance with Embodiment 4.

Referring to FIG. 19, a house 10B additionally includes a setting unit 90A and includes an ECU 70B in place of ECU 70, in the configuration of house 10 shown in FIG. 2.

Setting unit 90A is an input device for setting house load and a power source or power sources to be automatically turned on/off dependent on connection/disconnection of connector 27. Specifically, setting unit 90A allows a resident of house 10 to register a power source or load to be automatically stopped when connector 27 is detached from connector 54 on the side of the house, and to register a power source or a load to be automatically operated when connector 27 is connected to connector 54.

ECU 70B receives a signal SGL indicating the state of connection of connector 27, from connector 54 on the side of the house. ECU 70B determines whether connector 27 is connected or disconnected dependent on the change in signal SGL, and based on the result of determination, executes activation/inactivation of an inverter corresponding to the power source registered with setting unit 90A, and outputs a signal PWR instructing activation/inactivation of a load registered with setting unit 90A to house load 50. Other functions of ECU 70B are the same as those of ECU 70.

Figure 20:
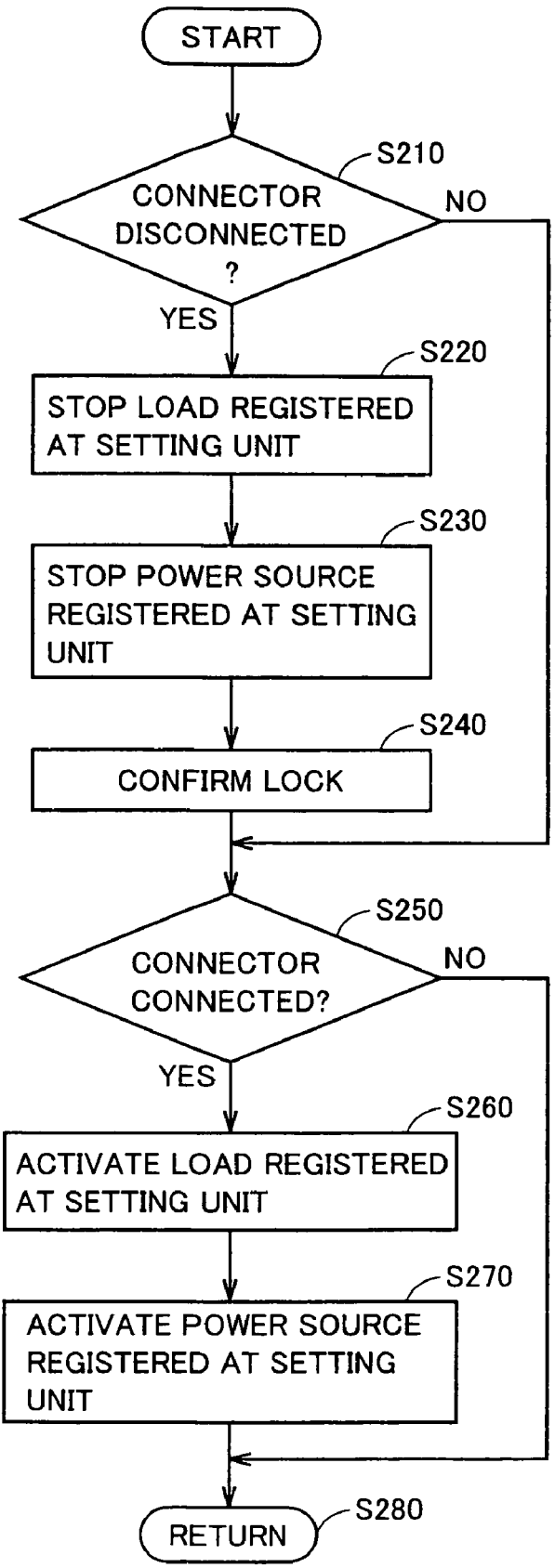
FIG. 20 is a flowchart of control by the ECU shown in FIG. 19.

FIG. 20 is a flowchart of control by the ECU shown in FIG. 19. The process of this flowchart is called from the main routine and executed at every prescribed interval or every time prescribed conditions are satisfied.

Referring to FIG. 20, ECU 70B determines whether connector 27 is disconnected from connector 54 or not, based on the signal SGL from connector 54 (step S210). If it is determined by ECU 70B that connector is not disconnected (NO at step S210), the process proceeds to step S250, which will be described later.

If it is determined at step S210 that the connector is disconnected (YES at step S210), ECU 70B stops the load registered at setting unit 90A (step S220), and stops the power source registered at setting unit 90A (step S230). Thereafter, ECU 70B confirms the lock of house 10 (step S240).

Thereafter, ECU 70B determines whether connector 27 is connected to connector 54 or not, based on the signal SGL (step S250). If it is determined by ECU 70B that the connector is not connected (NO at step S250), the process proceeds to step S280.

If it is determined at step S250 that the connector is connected (YES at step S250), ECU 70B activates the power source registered at setting unit 90A (step S260), and activates the load registered at setting unit 90A (step S270).

As described above, according to Embodiment 4, the state of connection between vehicle 10 and house 20 is monitored, and the power source and the load registered at setting unit 90A can be automatically stopped/operated using connection/disconnection of the connector as a trigger. Therefore, a convenient power system is realized.

In each of the embodiments described above, it is assumed that houses 10, 10A and 10B include a fuel cell, a photovoltaic array and a UPS as installed power sources. Each house, however, may include only one or two of these, or it may include an additional power source or power sources.

Further, though it is assumed in the foregoing that vehicle 20 includes motor generators MG1 and MG2 and that when the electric power is supplied and received to/from the house 10, electric power is input/output through neutral points N1 and N2 of motor generators MG1 and MG2, a dedicated inverter for power exchange between power storage device B and connection cable 25 may be provided separately.

Further, though it is assumed in the foregoing that vehicle 20 is a hybrid vehicle mounting an engine and a motor generator as power sources, vehicle 20 may be any vehicle that has a power storage device installed therein to allow charging/discharging from/to the outside of the vehicle.

In the foregoing, connection cable 25 and connectors 27 and 54 form the "connecting device" of the present invention, and power management stations 52, 52A and 52B correspond to the "power management device" of the present invention. Further, storage unit 114 corresponds to the "data storage unit" of the present invention, and ECUs 70, 70A and 70B correspond to the "first controller" of the present invention.

Further, boost converter 310, inverters 320 and 330, and motor generators MG1 and MG2 form the "voltage converting device" of the present invention, modem 230 corresponds to the "communication device" of the present invention, and MG-ECU 340 corresponds to the "second controller" of the present invention. Further, classification/learning unit 124 corresponds to the "classification unit" of the present invention, and scheduling unit 126 corresponds to the "planning unit" of the present invention. Further, setting unit 90 corresponds to the "setting unit" of the present invention.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A power system, comprising:
    a vehicle configured to be capable of outputting electric power stored in a power storage device to the outside of the vehicle and capable of charging said power storage device from the outside of the vehicle;
    a connecting device configured to be capable of receiving and supplying electric power between said vehicle and a power line in a house; and
    a power management device managing electric power in said house, wherein
        said power management device includes:
            a data storage unit storing data of electric power supplied to said house and electric power consumed by said house, and data corresponding to an external factor having an influence on increase/decrease of said supplied electric power and said consumed electric power, and
            a first controller controlling charge/discharge of the vehicle electrically connected to said house by said connecting device, based on the data stored in said data storage unit.

2. The power system according to claim 1, wherein said vehicle includes:
    said power storage device,
    a voltage converting device configured to be capable of converting voltage between said power storage device and said power line in said house connected by said connecting device,
    a communication device for communication with said power management device by said connecting device, and
    a second controller controlling said voltage converting device based on a command received from said power management device by said communication device.

3. The power system according to claim 1, wherein said first controller includes:
    a classification unit classifying electric power data stored in said data storage unit based on the external factor data stored in said data storage unit, and
    a planning unit planning charge/discharge of the vehicle connected to said house by said connecting device, based on the data classified by said classification unit.

4. The power system according to claim 3, wherein said classification unit classifies the electric power data stored in said data storage unit, using any of cluster analysis, hidden Markov model and neural network techniques.

5. The power system according to claim 3, wherein said planning unit plans charge/discharge of said vehicle based on amount of carbon dioxide emitted for generating electric power consumed by said house.

6. The power system according to claim 3, wherein said planning unit plans charge/discharge of said vehicle based on electric power cost of said house.

7. The power system according to claim 3, wherein said power management device further includes a setting unit allowing a user to set a charge/discharge plan of said vehicle; and
said planning unit plans charge/discharge of said vehicle based on the charge/discharge plan set by said setting unit.

* * * * *